US006376063B1

(12) United States Patent
Rasmussen et al.

(10) Patent No.: US 6,376,063 B1
(45) Date of Patent: Apr. 23, 2002

(54) MAKING PARTICULATES OF CONTROLLED DIMENSIONS BY ELECTROPLATING

(75) Inventors: Glen L. Rasmussen, Seattle; Micheal E. Dickson, Federal Way; Robert J. Miller, Fall City; Mary J. Nelson, Seattle; Jonathan C. Hughes, Stanwood; Diane C. Rawlings, Bellevue, all of WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/330,925

(22) Filed: Jun. 14, 1999

Related U.S. Application Data

(60) Provisional application No. 60/089,328, filed on Jun. 15, 1998.

(51) Int. Cl.[7] .............................. B32B 5/16; H01F 1/06

(52) U.S. Cl. ....................... 428/328; 148/306; 148/313; 252/62.51; 428/402; 428/403; 428/935

(58) Field of Search ................................ 428/402, 403, 428/935, 328; 148/306, 313; 252/62.51

(56) References Cited

U.S. PATENT DOCUMENTS

| | | | |
|---|---|---|---|
| 3,419,901 A | 12/1968 | Nordblom | |
| 3,445,624 A | 5/1969 | Sumnen | |
| 3,555,265 A | 1/1971 | Feller | |
| 3,607,675 A | 9/1971 | Haines | |
| 3,698,055 A | * 10/1972 | Holtz, Jr. et al. | 29/180 |
| 3,709,439 A | * 1/1973 | Tundermann et al. | 241/15 |
| 3,860,509 A | 1/1975 | Emmett, Jr. | |
| 3,920,468 A | * 11/1975 | Brown et al. | 106/286 |
| 3,922,209 A | * 11/1975 | Passal | 204/43 T |
| 3,941,584 A | * 3/1976 | Tundermann et al. | 75/5 R |
| 3,986,901 A | 10/1976 | Plante et al. | |
| 4,002,507 A | 1/1977 | Radeloff et al. | |
| 4,028,199 A | * 6/1977 | Holland | 204/10 |
| 4,054,530 A | 10/1977 | Deffeyes | |
| 4,150,981 A | 4/1979 | O'Handley | |
| 4,381,943 A | 5/1983 | Dickson et al. | |
| 4,761,327 A | 8/1988 | Hamano et al. | |
| 4,773,978 A | 9/1988 | Thomassen et al. | |
| 4,863,516 A | 9/1989 | Mosser et al. | |

(List continued on next page.)

FOREIGN PATENT DOCUMENTS

WO WO 93/05877 4/1993

OTHER PUBLICATIONS

Suslick, Kenneth S., "Applications of Ultrasound to Materials Chemistry," MRS Bulletin, (Apr. 1995) pp. 29–34.

Haggin, Joseph, "Nanostructured Catalysts Prepared," C&EN, 209th ACS National Meeting, Anaheim, Apr. 24, 1995, p. 47.

(List continued on next page.)

*Primary Examiner*—Hoa T. Le
(74) *Attorney, Agent, or Firm*—John C. Hammar

(57) ABSTRACT

We make particulates, especially magnetic Fe—Co alloys having high magnetic permeability, of controlled dimensions, especially those having a narrow thickness size distribution centered around a median or target thickness in the range of about 0.1–1.0 μm, using electrodeposition typically on a smooth (polished) titanium cathode. Our preferred continuous process uses a rotating drum cathode inside a fixed anode to grow flakes and to produce them automatically by inherent instability in the deposited film. The drum preferably rotates about a substantially vertical axis. The particulates shed (slough off) into the electrolyte (because of mismatch between the cathode surface and the plated metal or alloy at the molecular level) where they are separated in a magnetic separator or other suitable device. If the flakes are soft iron or iron-cobalt alloys, the drum generally is titanium or titanium alloy.

14 Claims, 5 Drawing Sheets

U.S. PATENT DOCUMENTS

| | | | | |
|---|---|---|---|---|
| 4,879,140 A | | 11/1989 | Gray et al. | |
| 5,100,599 A | | 3/1992 | Gurnick et al. | |
| 5,261,955 A | | 11/1993 | Nadkarni | |
| 5,456,986 A | | 10/1995 | Majetich et al. | |
| 5,520,717 A | | 5/1996 | Miller et al. | |
| 5,578,183 A | | 11/1996 | Cooper | |
| 5,679,234 A | * | 10/1997 | Imamura | 205/123 |
| 5,874,167 A | | 2/1999 | Rawlings et al. | |
| 6,010,610 A | * | 1/2000 | Yih | 205/149 |

OTHER PUBLICATIONS

Suslick, K.S. et al., "Sonochemical Synthesis of Amorphous Iron," Nature, Oct. 3, 1991, vol. 353, pp. 414–416.

Billas, I.M.L. et al., "Magnetism from the Atom to the Bulk in Iron, Cobalt, and Nickel Clusters," Science, Sep. 16, 1994, vol. 265, pp. 1682–1684.

Gibson, C.P. et al., "Synthesis and Characterization of Anisometric Cobalt Nanoclusters," Science, Mar. 3, 1995, vol. 267, pp. 1338–1340.

Crum, Lawrence A., "Sonoluminescence" Physics Today, Sep. 1994, pp. 22–29.

Suslick, Kenneth S., "The Chemistry of Ultrasound," Yearbook of Science and the Future, Encyclopaedia Britannica, Inc., 1994.

Crum, L.A., "Sonoluminescence, Sonochemistry, and Sonophysics," The Journal of the Acoustical Society of America, Jan. 1994, vol. 95, No. 1, pp. 559–562.

Suslick, Kenneth S., "Sonochemistry," Science, Mar. 23, 1990, vol. 247, Part I, pp. 1439–1445.

* cited by examiner

*Fig. 11*
Ru plated on Ti.
150X
25.0 kV
AMRAY
40041

MAKING PARTICULATES OF CONTROLLED DIMENSIONS BY ELECTROPLATING

REFERENCE TO RELATED APPLICATION

The present application claims the benefit of U.S. Provisional Patent application No. 60/089,328, filed Jun. 15, 1998.

TECHNICAL FIELD

The present invention relates to an electroplating method for making particulates of controlled dimensions, to the particulates themselves (especially magnetic Fe—Co ones), and to products using the particulates.

BACKGROUND OF THE INVENTION

Flat metallic particles of controlled thickness and shape typically are difficult and expensive to make. Ball milling results in relatively thick flake with little control of size and shape. Vacuum deposition followed by a chemical or mechanical removal of particulates from the substrate is costly with little control of shape of the flake. Vacuum/chemical vapor deposition of coatings onto existing particulates such as flakes (e.g., mica) or spheres produces flakes limited to the shape and size of the existing particulate. Pre-existing flake shapes are typically too thick and the shape too jagged for high performance coatings.

Thin film metal particulates are expensive, because existing process to make them, like those described in U.S. Pat. Nos. 4,879,140 or 5,100,599, use exotic equipment such as plasma generators or vacuum chambers, or are labor intensive, small scale processes like photolithography. The equipment cost and relative slow rate of production using skilled labor to operate the sophisticated equipment increases the cost. The prior art particulates are not readily produced in reasonable volume, and cost as much as $5,000/oz. At these prices, paints that use the particulates as the pigment are only suitable for highly specialized applications. There is a need for a lower cost, higher volume process for rapidly and reliably making thin film metal particulates usable as paint pigments.

In U.S. Pat. No. 5,100,599, Jensen et al. described a vapor deposition/photolithography method for making thin film particulates of controlled shape. Independent deposition sites are defined with layers of photoresist. The thin films are deposited on the sites. Then, the photoresist is dissolved to free the flakes.

In U.S. Pat. No. 5,895,524, Dickson described a method for making thin film metal particulates including the steps of immersing a metallized sheet of fluorinated ethylene propylene (FEP) first in an aqueous base and then in an aqueous acid to loosen and release the metal from the FEP. The particulates are brushed from the FEP into the acid tank, and are recovered. The FEP is reusable. The particulates are usually aluminum or germanium metal having a thickness of about 900 to 1100 Å, and preferably, 1000 Å. The method for freeing the particulates may also include ultrasonically vibrating the metallized sheet following the immersions.

For making aluminum particulates, the preferred base is 7% $Na_2CO_3$ and the preferred acid is 0.01–0.1 N acetic acid. For making germanium particulates, the preferred base is 2.5 N NaOH, since this metal is harder to loosen from the FEP. The acid bath neutralizes the basic reaction between the metal film and base.

The base immersion takes about 15 seconds. Prior to the acid immersion, the base-treated metallized film is exposed to air for about 25 seconds. The acid immersion lasts about 15 seconds before brushing the particulates from the FEP. A metallized roll of the FEP is readily towed through the several operations in a continuous process, as will be understood by those of ordinary skill.

Particulates are recovered from the acid bath by filtering, rinsing, and drying. The particulates are sized. Then, as described in U.S. Pat. No. 5,874,167, the particulates are treated using conventional aluminum treatments. Suitable treatments include applying chemical conversion coatings or protective sol coatings. The conversion coatings may be chromic acid anodizing, phosphoric acid anodizing, Alodine treating (particularly using either Alodine 600 or Alodine 1200); cobalt-based conversion coating as described in Boeing's U.S. Pat. Nos. 5,298,092; 5,378,293; 5,411,606; 5,415,687; 5,468,307; 5,472,524; 5,487,949; and 5,551,994; or the like. The sol coating method creates a sol-gel film on the surface using a hybrid organozirconium and organosilane sol as described in Boeing's U.S. Pat. No. 5,849,110. Related sol-gel coated aluminum flakes are described in U.S. Pat. No. 5,261,955.

The different treatments can impart different tint to the pigment. Alodine imparts a yellow or greenish-yellow tint. The cobalt treatments impart blue tints.

The sol coating is preferable a hybrid mixture wherein the zirconium bonds to the aluminum flake covalently while the organic tail of the organosilane bonds with the paint binder. The anodizing treatments promote adhesion primarily by mechanical surface phenomena. The sol coating provides adhesion both through mechanical surface phenomena (surface microroughening) and through chemical affinity, chemical compatibility, and covalent chemical bonds.

The particulates are pigments for paints or surface coatings and generally are used in urethane, cyanate ester, or urea binders. The organosilane in the sol coating generally will include a lower aliphatic amine that is compatible with the binder.

Kenneth Suslick of the University of Illinois pioneered research into sonochemistry, a technique that uses the energy of sound to produce cavitation bubbles in a solvent. The bubbles collapse during the compression portion of the acoustic cycle with extreme microscale energy release evidenced by high (microscale) localized temperatures and pressures estimated at about 5200° F. and 1800 atm, respectively. Suslick determined that sonochemistry was an effective way to produce amorphous metal particles. He developed laboratory processes for making amorphous iron agglomerates desired as catalysts in hydrocarbon reforming, carbon monoxide hydrogenation, and other reactions.

Suslick also discovered that he could produce metal colloids and supported catalysts if he sonicated the metal precursors (principally volatile metal carbonyls or other organometallics) with a suspended polymer like polyvinylpyrrolidone or with suspended inorganic oxide supports, such as silica or alumina.

Suslick's work focused on sonochemical techniques to form catalysts composed of agglomerated metal nanoparticles. These catalysts are efficient because of their large surface areas. His work is described in the following articles that we incorporate by reference:

(1) K. Suslick, "*Sonochemistry,*" 247 Science 1439–1445 (Mar. 23, 1990);

(2) K. Suslick et al., "*Sonochemical Synthesis of Amorphous Iron",* 353 Nature 414–416 (Oct. 3, 1991); and (3) K. Suslick, "*The Chemistry of Ultrasound*," Yearbook of Science & the Future, Encyclopedia Britannica, Inc., 138–155 (1994). Similar work is described in the following articles by Lawrence Crum, that we also incorporate by reference:

(1) L. Crum, "*Sonoluminescence*," Physics Today, September 1994, pp. 22–29, and (2) L. Crum "*Sonoluminescence, Sonochemistry, and Sonophysics*", J. Acoust. Soc. Am. 95(1), January 1994, pp. 559–562.

Gibson sonicated $Co^{2+}$ (aq) with hydrazine to produce anisometric cobalt nanoclusters. Science, vol. 267, Mar. 3, 1995. He produced anisometric, hexagonal disk-shaped, cobalt nanoclusters about 100 nanometers in width and 15 nanometers in thickness with oriented (001) crystals comparable to cells of α-cobalt. The nanoclusters were small enough to be strongly influenced by Brownian forces and thereby were resistant to agglomeration. Working with hydrazine, however, on a commercial scale poses safety questions.

In U.S. Pat. Nos. 5,520,717; 5,766,764; and 5,766,306, Boeing described a process to create "nanophase" or "nanoscale" amorphous metal particles with Suslick's sonochemistry techniques using organometallic precursors like iron pentacarbonyl ($Fe(CO)_5$) in an alkane (like n-heptane or n-decane) under an inert atmosphere with sonication at about 20 kHz and 40–100 Watts for 0.1–24 hours. The particles (distributed in the range of about 5–100 nm in diameter) were extracted from the alkane using a polar solvent of reasonably high vapor pressure, such as ethylene glycol monomethyl ether ($CH_3O—CH_2CH_2—OH$). Then, a polymer or polymeric precursors (especially those of vinylpyrrolidone, an acrylic, or a urethane) were added with or without surfactants to coat and separate the metal particles.

To produce individual or agglomerated metal particles in the particle size distribution range of 10–30 nm with sonochemistry, a continuous process involved the steps of:

(a) feeding neat metal carbonyl, like iron pentacarbonyl, to a reactor;

(b) sonicating the neat metal carbonyl to produce nanoscale particles; and (c) separating the particles from the metal carbonyl, preferably in a magnetic separator.

This process produced nominal 30 nm diameter particles of iron or iron alloys. Being continuous eliminated the need to use an alkane or water, and, thereby, greatly simplified the process. Using the hydrocarbon impaired the continuous preparation of the particles when we attempted larger reaction quantities and tried to replenish the reactants, although we do not understand why the production rate declined when a hydrocarbon medium was used in addition to the organometallic precursor (i.e. $Fe(CO)_5$). To avoid undue agglomeration and to produce finer particles smaller than 30 nm in diameter, a surfactant was added prior to separation of the particles.

Agglomerated particles from such a process can be reconstituted into a large individual particle by rapidly heating the particles with, for example, microwaves to the melt followed by resolidification into a unitary nanophase particle. Generally these nanoscale particles are smaller than are practical for our preferred coatings.

In U.S. Pat. No. 3,419,901, Nordblom described a method for producing flakes of nickel about 1/16 inch square by about 0.000040 inches (1 μm) thick. Nordblom applied an electrically nonconducting grid over a cathode and plated nickel. He removed the nickel plate as flakes by impinging sprays of electrolyte or other fluids on the cathode. The flakes were used in nickel-alkaline batteries along with nickel oxyhydrate active material to increase conductivity of the positive plates.

Nordblom described that a prior art process to Pilling (U.S. Pat. No. 2,365,356) deposited nickel directly on a stainless steel cathode to produce a highly strained deposit of sheet nickel. This sheet broke up naturally into flake and sloughed off. Such flakes tended to curl and were unacceptable for batteries because of their shape. Also, they were too thick.

Nordblom suggested using a stainless steel or chrome-plated steel cylinder or drum scored with grooves 0.020 inches in depth to define the flakes. The drum was disposed with its axis extending substantially horizontally so that a portion of the drum's surface would dip into the electrolyte bath. Epoxy resin filled the grooves on the drum to create a grid and to define individual areas for growth of flakes, similar to the deposition sites Jensen used with the photolithography techniques described in U.S. Pat. No. 5,100,599. Nordblom plated the nickel from a nickel sulfamate bath and knocked the flakes from the drum using a stream of water or electrolyte. Generally, Nordblom metallographically and electrically polished (in phosphoric, sulfuric, and chromic acid) the surface of the electrode.

SUMMARY OF THE INVENTION

The present invention is a low cost, electroplating method for making particulates (i.e., flakes) of controlled dimensions. It is particularly preferred and important for many of our applications to control the thickness of the flakes to a target thickness in the range from about 0.5–1.0 μm and to collect flakes that have a narrow thickness size distribution centered around the target thickness. The preferred method involves three steps: First, we deposit a magnetic metal or alloy, especially iron or iron-cobalt, on a polished stainless steel, titanium metal, or Ti-6A1-4V cathode to a controlled thickness, Then, we remove the plated deposit in the form of a flake into the electrolyte. Third, we isolate the flake from the electrolyte. Usually we use a vertically disposed drum rotating inside a static anode. Such an apparatus allows the flake to slough off naturally into the electrolyte in the annulus when the particulates attain a desired thickness, typically about 1.0 μm. The isolated flakes can be treated with a protective chemical conversion or sol coating.

The particulates are useful in paints, transformers, electrical motors, or electronic metal pastes.

In one aspect, a preferred method of the present invention makes particulates of controlled dimension having a controlled thickness within a narrow thickness distribution. The method involves:

(a) electroplating a substantially uniformly thick layer of the particulate onto a cathode from an electrolyte, the thickness being in the range from about 0.1 μm to 1.0 μm;

(b) separating the layer from the cathode to define flakes in the electrolyte having a size on the order of (no more than about 0.001 inch long)×(no more than about 0.001 inch wide)×(the desired thickness); and (c) separating the flakes from the electrolyte.

In another aspect, the present invention relates to protecting the flakes following their separation from the electrolyte either with a chemical conversion coating or with a mixed metal sol-gel coating.

In yet another aspect, the present invention relates to a coated substrate having a layer of generally aligned particulates on one surface, the particulates being applied by spraying or another suitable approach and being bound to the substrate in a binder, the particulates being metal or mixed metal having a median thickness of about 0.50–1.0 μm, the particulate size distribution being tightly centered around the median. Generally, the particulates are rectangular in planar configuration apart from their thickness having a length no more than about 0.001 inches and a width no more than about 0.001 inches.

In yet another aspect, the present invention relates to a paint formulation, comprising a binder and an effective amount of metallic flakes, especially iron-cobalt alloy flakes, dispersed as a pigment in the binder. The flakes preferably include a chemical conversion coating or a mixed metal sol-gel coating. They also have a target thickness of about 0.5–1.0 μm and a thickness size distribution tightly centered around the target thickness.

Finally, the present invention relates to iron-cobalt alloy flakes, comprising an electroplated alloy of iron and cobalt having a target thickness of about 0.5–1.0 μm and a thickness size distribution tightly centered around the target thickness and, optionally, a chemical conversion coating or a mixed metal sol-gel coating on each flake.

DETAILED DESCRIPTION OF THE PRESENT INVENTION

The present invention preferably provides a lower cost, continuous method of fabricating conductive particulates (i.e., flakes) with improved control of thickness, size, and shape. Thickness control for flakes used in electromagnetic applications results in lower electrical losses (due to reduced eddy currents) and weight efficiencies because the flakes can be thinner than the electromagnetic skin depth. Thickness control for optical materials is important in reducing the optical scatter from the particle edges. Size control is important for many types of materials, but thickness control for us, independent of absolute size and shape, is a more important consideration for the particulates that we make. For example, in the optical region, reflectivity is often a strong function of particle size. Shape control is important for achieving desired optical, dielectric, and magnetic properties. Our ability to control thickness, size, and shape using the plating process of the present invention is also useful for fabrication of elements in solid-state sensors and actuators (intelligent materials). By "size" we mean the nominal dimensions of a flake in the X-Y plane (if Z is the thickness of the flake in a Cartesian coordinate system). By shape, we mean the geometry in the X-Y plane. We are interested both in making particulates that are uniformly small in their dimensions and have the same shape or similar shape. The particulates may be "congruent," so that they are precisely the same planar shape be it all triangular, rectangular, square, or the like. They may be a family of different sizes of essentially the same geometric shape (i.e., all rectangles). We prefer flakes where all dimensions are controlled to have a narrow size distribution around a target dimension, but it is most critical for many of our applications that we control the thickness with a target thickness selected from the range of about 0.5–1.0 μm.

Figure 6:
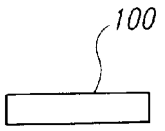
FIG. 6 is a side elevation of a smooth electrode (cathode) surface.
Figure 7:
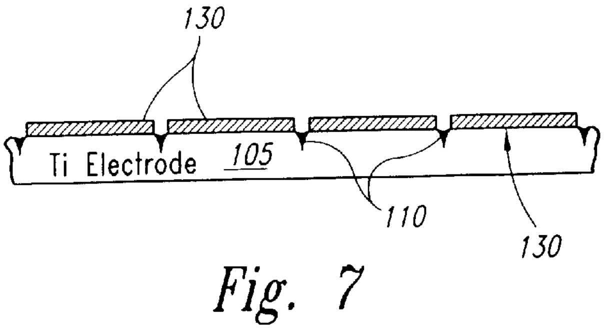
FIG. 7 is a side elevation showing plating of metal flakes on the surface of an electrode having a grid scored in its surface.
Figure 8:
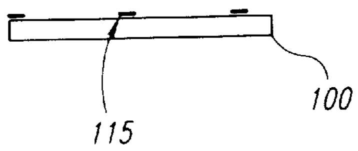
FIG. 8 is another side elevation showing photoresist on the surface of a smooth electrode to define separate areas for flake growth.
Figure 9:
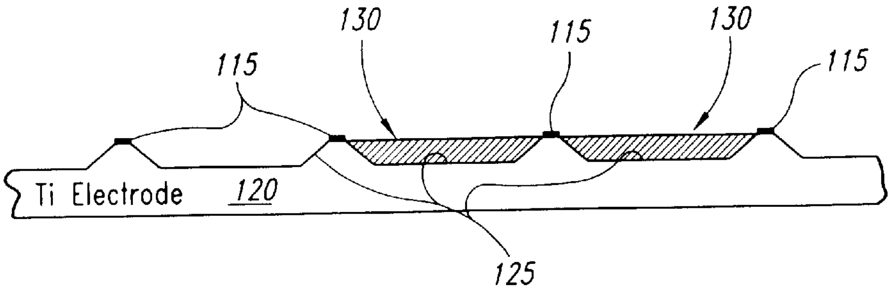
FIG. 9 is yet another side elevation showing a patterned electrode for making a 3-D shaped flake.

Our preferred method for fabricating metallic or other conductive particulates (e.g., conductive polymers) of controlled thickness can produce particulates as small as 0.1 μm in target thickness, but, generally, we seek to make them around 1 μm. The method allows us to control the size and shape as well, if desired. It uses electrodeposition to form a conductive film on a cathode and ultrasound, mechanical separation techniques, inherent instability in the film, or a combination of these processes to release the deposited flakes from the cathode. The method may be batch or continuous. The cathodes are designed to provide uniform deposition rates, easy removal of the flakes, and tailoring of their size and shape. FIGS. 6–9 show cathodes that can be used to control size and shape. A typical cathode 100 is made from stainless steel, titanium metal, or titanium alloy, such as Ti-6A1-4V, so that the deposited flake material is only weakly adhered. Surface finishes are typically very smooth (10 μm) to enhance flake removal. FIG. 6 shows a smooth, flat or curved cathode 100; FIG. 7 shows a grid electrode 105 for defining particle shape and size. Depressions 110 in the cathode may be filled with a non-conductive resist or another resin, like Nordblom, to prevent deposition between particles. The exposed cathode surfaces are plated to form particulates of a desired shape and dimension. Alternatively, a resist pattern 115 can be applied directly to the smooth (non-structured) cathode surface (FIG. 8). FIG. 9 shows cathode 120 having accurately shaped wells 125 to fabricate particulates 130 with controlled 3-D shape, e.g., trapezoidal cross section.

The cathode surface must contain sufficient nucleation sites for electrodeposition of thin, uniform films, since controlling the thickness of the flake is the goal of the method. Excessive polishing of the cathode surface may result in insufficient density of nucleation sites. This problem can be alleviated in two ways. A standard way is to add chemicals to the plating bath which enhance nucleation. An alternative way is to create a uniform distribution of nucleation sites using small-scale patterning of the cathode surface. Electroplating occurs at room temperature or slightly elevated temperature using readily available, common laboratory or production equipment. We believe that any material that can be electroplated can be formed into controlled dimension flakes, but we prefer to make metal flakes. Electrodeposition can be started and stopped with a high degree of control to produce particles of precise thickness, or thickness can be controlled in other ways, such as using natural forces to slough the flakes off a rotating drum because of instability of the plated film on the drum. We produce particles of precise thickness for polypyrrole, gold, copper, iron, nickel-iron alloys, iron-cobalt alloys, or the like. Many electrochemical baths (i.e., electrolytes) are either purchased or made from common chemicals. Iron flakes are often made using a non-toxic aqueous solution of ferrous sulfate.

Figure 10:
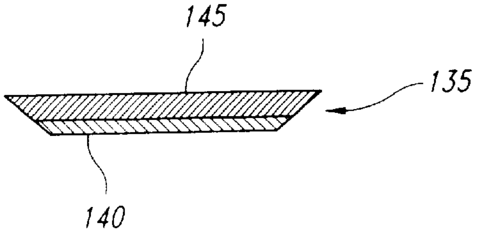
FIG. 10 is a side elevation of a trapezoidal shaped flake made with layers of two metals.

We can make multilayer flakes 135 of different metals or alloys 140 and 145 (FIG. 10) by moving the electrode to different chemical baths or in a continuous flow-through system by switching the flow of electrolytes. Also, a magnetic field could be used during the deposition to achieve higher anisotropies within the flakes.

We remove the deposited material from the electrode to form flakes by ultrasound, mechanical brushing, thermal shock, reversing the polarity, piezoelectrically-induced vibration of the electrode, electric pulse, a combination of these techniques, or any other suitable technique. The flake particulates are collected by any suitable means, including filtering, gravitational separation, or magnetic separation. The particles can then be treated by other chemical or non-chemical means to provide color/tint variation, oxidation/corrosion protection (i.e., conversion coated), as described with reference to our high efficiency metal pigments in U.S. Pat. No. 5,874,167, or both.

The various processing steps are controllable with computerized controls to provide high precision.

Figure 1:
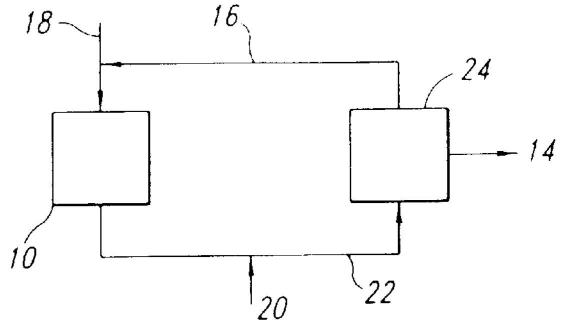
FIG. 1 is a block diagram illustrating a preferred continuous flake manufacturing method according to the present invention.

A preferred continuous method for making iron-cobalt flakes is illustrated in the block diagram of FIG. 1. Plating occurs in a first cell 10 that is an accumulator for electrolyte. The flakes are carried with the electrolyte (as known as the electroplating solution) 12 (FIG. 2) into a magnetic separator 24 where the iron-cobalt particles 14 are separated from the electrolyte, is recycled through line 16 with appropriate replenishment 18 while the flakes are removed, washed, and sized. A surfactant 20 can be added to the flake-filled electrolyte 12 during transport through line 22 from the plating cell 10 to the separator 12.

Figure 2:
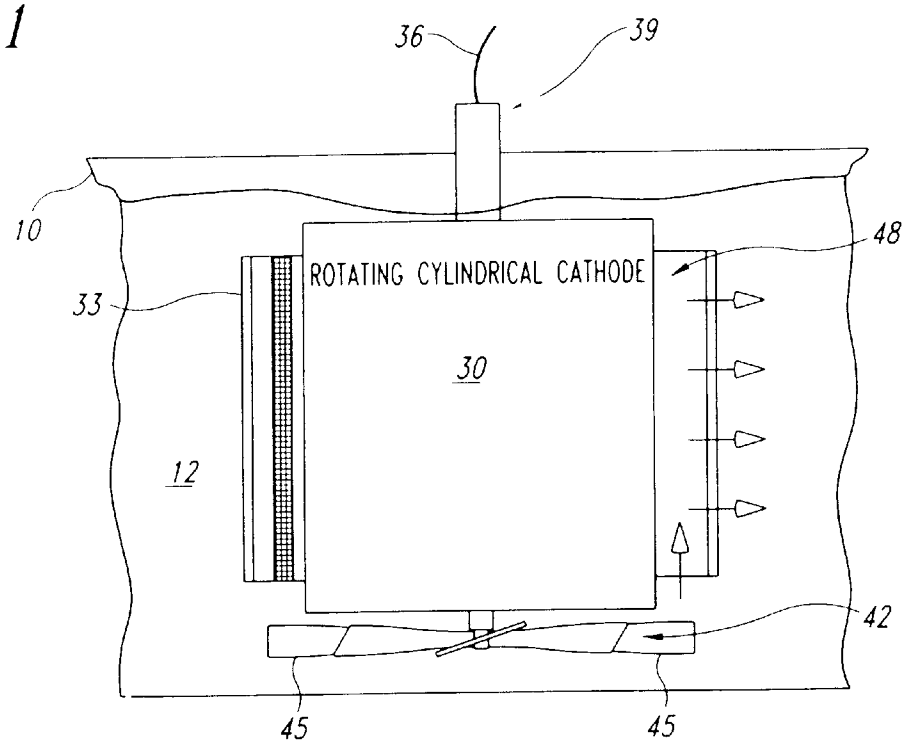
FIG. 2 is a cross sectional view of a preferred electroplating apparatus for making flakes (i.e., "particulates").
Figure 3:
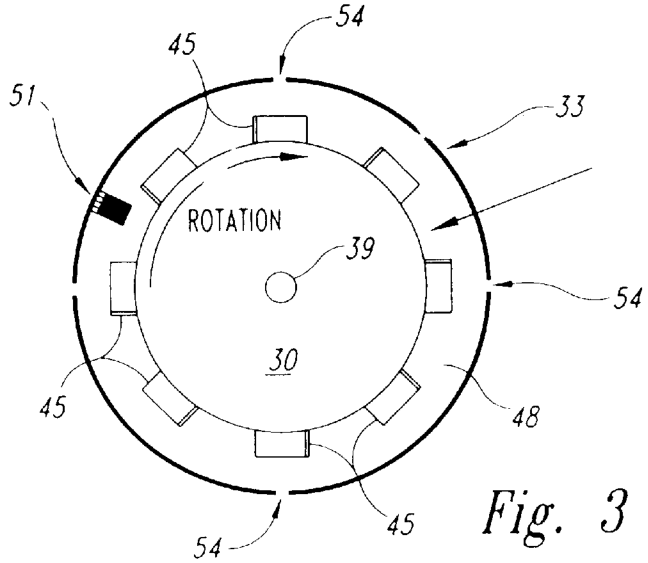
FIG. 3 is plan view of the apparatus of FIG. 2.

The electroplating cell 10 preferably includes a rotating drum cathode 30 disposed vertically within a fixed cylindrical anode 33, as shown in FIGS. 2 and 3. The drum 30 is submerged in the electrolyte 12. Power is supplied to the cathode with a lead 36 through the drive axle 39. An impeller 42 with pitched blades 45 is attached to the axle at the underside of the cathode and below the anode to pump electrolyte 12 in the annulus 48. Baffles 51 on the inside of the anode 33 disrupt flow. Slots 54 in the anode allow electrolyte drawn into the cylinder to escape into the larger accumulator volume where electrolyte rich in flakes is drawn into a magnetic separator, in the case of iron-cobalt flakes, for isolation of the flakes. After suitable replenishment, the electrolyte is recycled to the electroplating cell. Circulation of electrolyte in the annulus is shown with the arrows in FIG. 2.

The drum is preferably smooth (polished) stainless steel or titanium (pure metal or Ti-6A1-4V) when we make iron flakes or iron-cobalt flake. It can include grids as described with respect to the flat electrodes of FIGS. 7–9 or in Nordblom. The drum rotates at about 1–10 revolutions/second (rps) and, preferably, 10 rps for a 2 inch diameter drum positioned within a 6 inch diameter PVC pipe having iron and cobalt plates suspended within it near the inside wall to form an anode.

The drum diameter can be increased to as large as 4.6 inches with this anode. The dimensions of the drum and the gap between the anode and cathode defining the annulus affect circulation of the electrolyte and sloughing off of the flake. We prefer to maximize the surface area of the cathode to maximize the production rate of flakes. We have not yet tested all suitable anode-cathode configurations and have not optimized the method for sloughing off the flake. We currently rely on natural forces for the sloughing off but intend to experiment with ultrasound in the cathode continually or in periodic pulses to assist release of the flakes from the cathode.

Slower rotation leads to thicker flakes. We are uncertain of the optimum speed, but believe it to be tied to the rate of plating (the current density in the cathode) and the circulation of electrolyte in the annulus.

We prefer to make an iron/cobalt alloy having about equal parts of iron and cobalt, although the important criterion for our preferred flake is the magnetic permeability, which we seek to maximize. Therefore, there should be an equal number of equal size plates, in the case of iron-cobalt flakes. Their distribution is not critical, but we usually alternate them. Cobalt in the alloy adds corrosion resistance to the alloy. Such resistance improves the flake for certain applications. The metals forming the anode can be in the form of rods, bars, plate, particles, etc., providing substantially equal volumes.

Our target flake is about 0.001 inch square and of a uniform thickness in the range from about 0.5–1.0 μm thick. We can sieve these flakes to form even finer flakes having nominal dimensions in the X-Y plane on the order of 10–40 μm and, preferably, 20 μm. Therefore, the preferred flake is 20 μm×20 μm×0.5 μm. Our goal is to produce flake within a narrow thickness size distribution centered around a median, target thickness in the range from 0.5–1.0 μm, and a typical thickness of either 0.5 or 1.0 μm. That is, it is important that all the flakes in a batch have substantially the same thickness. The preferred process produces particulates of the desired thickness, thickness distribution, size, size distribution, shape, and shape distribution.

Iron or iron-cobalt apparently peels away from the titanium drum because different atomic spacing between the metal and the plating produces internal stress that tears the flake from the drum when it reaches about 1 μm.

The bath temperature also seems to be important to control the thickness, but we have not deduced the correlation of thickness as a function of temperature empirically. Our preferred processing temperature is about 11° C. (60° F.). The bath generally includes iron sulfates and cobalt sulfates in amounts adequate to from an electrolyte and to plate out the desired iron-cobalt alloy.

We maintain the pH in the electrolyte preferably in a range from about pH 4.7–5.2 by titrating the solution with sulfuric acid. Typically we control the pH within a narrow range at a selected pH during any plating run.

Our flakes generally are magnetic alloys, so we could include nickel, aluminum, or chromium in them. Chromium enhances corrosion protection typically by producing a passivation layer on the flakes.

Paint formulations include the flakes "as is" or treated with conversion coatings (as we described in U.S. Pat. No. 5,874,167) to control color or to provide corrosion resistance. We mix the flakes with a suitable paint binder or vehicle, such as an epoxy, polyimide, polyurethane, polycyanate ester, or polyurea. The preferred binder is an aliphatic polyurea made by condensing a tetraketimine with an isocyanate as described in U.S. patent application Ser. Nos. 08/994,899 and 08/992,601. A typical paint would include about 15–17 vol % flakes. Such a paint can be applied by spraying or another suitable process to align the flakes on the substrate.

The flakes can be used in transformers and electrical motors because they are not susceptible to heating with induced eddy currents caused by the oscillating magnetic field that these devices produce. The flakes are too small to interact with the oscillating magnetic fields. If the flakes are not magnetic, then separation of the flakes from the electrolyte typically will generally be by filtration.

Plating uses conventional current densities in accordance with the recommendations of the American Electroplaters & Surface Finishers Society.

EXAMPLES

The following examples show several trials in which we have demonstrated the process of the present invention to produce iron flake, gold flake, and iron-cobalt flake.

Iron Flake

1. Mix 192 g ferrous sulfate heptahydrate in 1000 ml of deoxygenated, deionized water.
2. Turn on filtering/collection system. Bubble nitrogen through the bath.
3. Place a carbon steel anode (1015 steel), and a flat, polished titanium (6A1-4V) cathode, like that in FIG. 5, into bath in opposing positions and hook up electrical connections.
4. With a rectifier, apply a current density of 20 to 40 amps per square foot for 8 seconds.
5. With a sonicator at approximately 80% power for 20 seconds, sweep across total area of cathode, approximately 1 inch away from cathode.
6. Repeat steps 4 and 5 to prepare the desired amount of particles.
7. Collect particles magnetically in the filtering/collection system.

Figure 4:
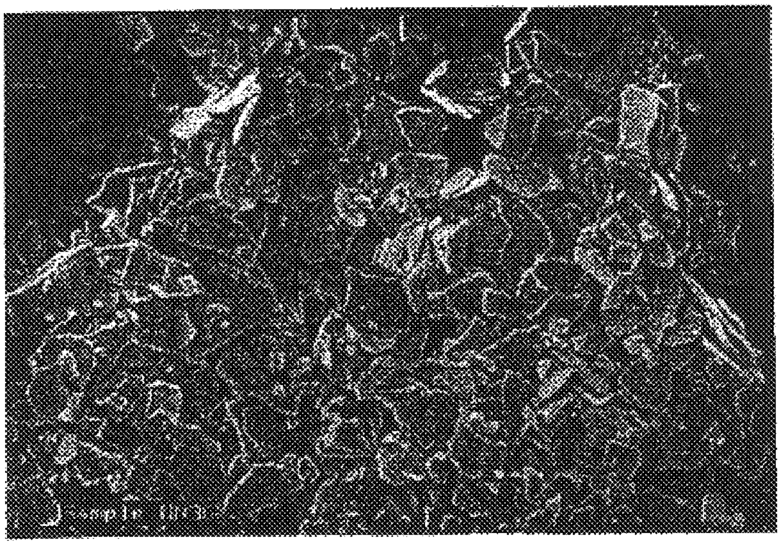
FIG. 4 is illustrates the typical flakes made using a preferred method of the present invention.
Figure 5:
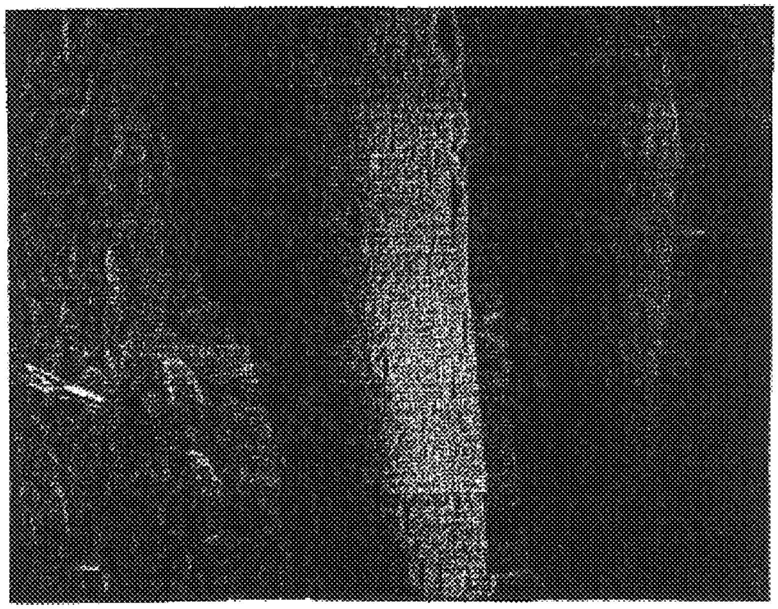
FIG. 5 is a pictorial view showing typical flakes on edge confirming their substantially uniform thickness.

FIGS. 4 and 5 show typical iron flake made by this process.

Gold Flake

1. Use a polished titanium cathode.
2. Heat a gold cyanide solution to 140° F. and agitate.
3. Apply 0.2–0.4 amps with titanium screen anode for 3–10 min at a current density of about 3–15 A/ft$^2$.
4. Mechanically or ultrasonically remove gold flake.
5. Filter the flake from the electrolyte.

Figure 11:
FIGS. 11 and 12 show gold flakes made with the method of the present invention.
Figure 12:
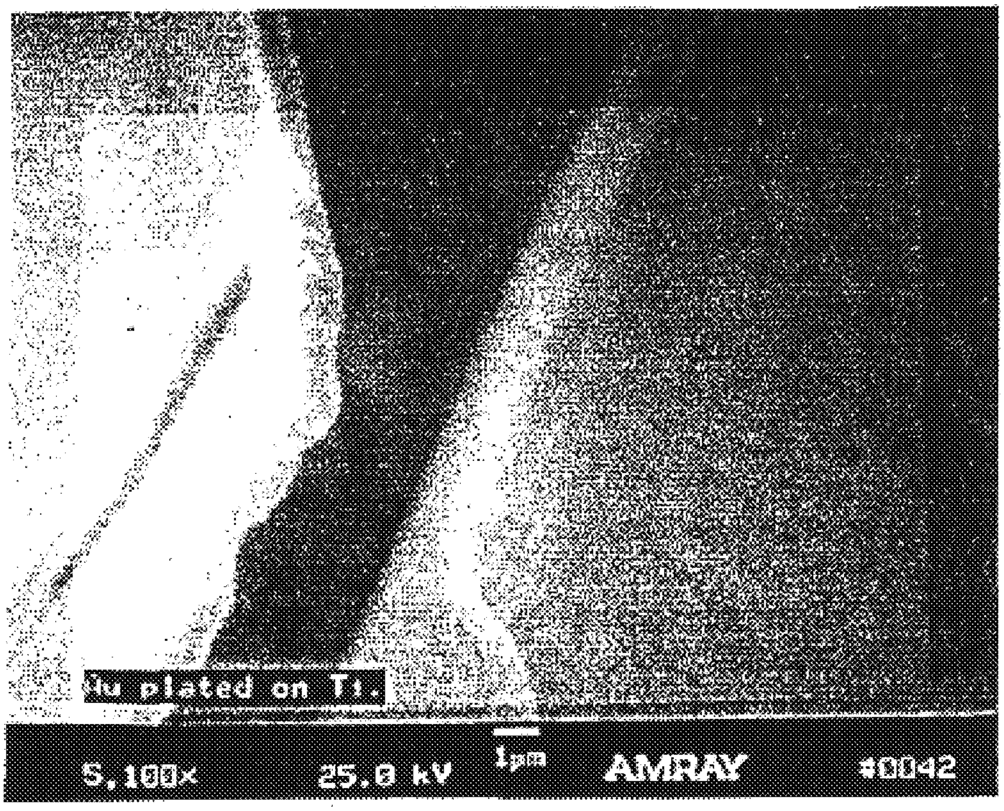

FIGS. 11 and 12 show gold flake made by this process.

Iron-Cobalt Flake

1. Prepare an electrolyte containing:
   0.25 M cobalt sulfate heptahydrate;
   0.10 M boric acid;
   3 g/l sodium potassium tartarate;
   0.3 g/l ascorbic acid
   0.25 M iron sulfate heptahydrate;
   0.10 M sodium sulfate;

11 g/1 sodium acetate; and to provide a solution having a pH between about 4.7–5.2.

2. Fill the accumulator of a drum plating apparatus of the type shown in FIG. 2 with the electrolyte.
3. Line the accumulator with an equal volume and area of iron and cobalt (typically using plates).
4. Deposit iron-cobalt on the 2 inch diameter, polished titanium cathode while rotating the drum at about 10 rps.
5. Withdraw flake-filled electrolyte from the accumulator to a separator.
6. Magnetically separate the flakes form the electrolyte in the separator.
7. Recycle or replenish the electrolyte.
8. Wash, size, and recover essentially 1 μm thick iron-cobalt flakes.

While we have described preferred embodiments, those skilled in the art will readily recognize alterations, variations, and modifications that might be made to the process or the resulting particulates without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A method for making magnetic particulates containing cobalt, iron, or both, having high magnetic permeability and controlled dimensions in the form of flakes having a controlled thickness within a narrow thickness distribution, comprising the steps of:

(a) electroplating a substantially uniformly thick layer of particulate onto a cathode from an electrolyte, the thickness of the layer being in the range from about 0.1 μm to 1.0 μm;

(b) separating the layer from the cathode to define flakes in the electrolyte having a size on the order of (no more than about 0.001 inch long)×(no more than about 0.001 inch wide)×(the desired thickness); and (c) separating the flakes from the electrolyte.

2. The method of claim 1 wherein separating includes the steps of:

(a) passing the electrolyte through a magnetic separator to isolate the flakes; and (b) replenishing and recycling the electrolyte from the separator for further plating.

3. Particulates produced by the method of claim 1.

4. The method of claim 1, further comprising the step of:

protecting the flakes following their separation from the electrolyte with a coating selected from the group consisting of a chemical conversion coating and a Zr—Si mixed metal sol-gel coating.

5. Particulates produced by the method of claim 4 being an iron-cobalt alloy.

6. Iron-cobalt alloy flakes, comprising:

(a) an electroplated alloy of iron and cobalt having a target thickness of about 0.5–1.0 μm and a thickness size distribution centered around the target thickness; and (b) optionally, a chemical conversion coating or a mixed metal sol-gel coating on each flake.

7. A method for making metallic flakes of controlled dimension having a controlled thickness within a narrow thickness distribution, comprising the steps of:

(a) electroplating a substantially uniformly thick layer of metal onto a rotating cathode having an axis of rotation disposed substantially vertically in an electrolyte contained within an anode, the thickness being in the range from about 0.1 μm to 1.0 μm, wherein the anode includes passages for egress of the electrolyte and flakes from an annulus between the cathode and the anode;

(b) separating the layer from the cathode to define flakes in the electrolyte having a size on the order of (no more than about 0.001 inch long)×(no more than about 0.001 inch wide)×(the desired thickness), wherein rotation aids separation of flakes from the cathode at the desired thickness because of inherent stress within the layer; and (c) separating the flakes from the electrolyte.

8. The method of claim 7, wherein separating includes the steps of:

(a) passing the electrolyte through a magnetic separator; and (b) replenishing and recycling the electrolyte from the separator for further plating.

9. The method of claim 8, wherein the method further comprises the step of:

protecting the flakes following their separation from the electrolyte either with a chemical conversion coating or with a mixed metal sol-gel coating.

10. Flakes made according to the method of claim 9 being an iron-cobalt alloy.

11. Flakes produced by the method of claim 7.

12. The flakes of claim 11 wherein the electrolyte and the flakes include iron.

13. The flakes of claim 11 wherein the electrolyte and the flakes include cobalt.

14. The method of claim 7, further comprising the step of:

protecting the flakes following their separation from the electrolyte either with a chemical conversion coating or with a Zr—Si mixed metal sol-gel coating.

* * * * *